(12) United States Patent
Shan

(10) Patent No.: US 9,935,694 B2
(45) Date of Patent: Apr. 3, 2018

(54) REDUCTION OF USER PLANE CONGESTION

(71) Applicant: INTEL IP CORPORATION, Santa Clara, CA (US)

(72) Inventor: Chang Hong Shan, Shanghai (CN)

(73) Assignee: Intel IP Corporation, Santa Clara, CA (US)

( * ) Notice: Subject to any disclaimer, the term of this patent is extended or adjusted under 35 U.S.C. 154(b) by 23 days.

(21) Appl. No.: 14/783,043

(22) PCT Filed: May 22, 2014

(86) PCT No.: PCT/US2014/039116
§ 371 (c)(1),
(2) Date: Oct. 7, 2015

(87) PCT Pub. No.: WO2014/193723
PCT Pub. Date: Dec. 4, 2014

(65) Prior Publication Data
US 2016/0050585 A1    Feb. 18, 2016

Related U.S. Application Data

(60) Provisional application No. 61/829,968, filed on May 31, 2013.

(51) Int. Cl.
*H04W 80/04* (2009.01)
*H04B 7/0456* (2017.01)
(Continued)

(52) U.S. Cl.
CPC ......... *H04B 7/0456* (2013.01); *H04B 7/0452* (2013.01); *H04B 7/0486* (2013.01);
(Continued)

(58) Field of Classification Search
CPC ............. H04L 12/2472; H04L 41/5019; H04L 65/4092; H04W 28/00; H04W 28/0289
See application file for complete search history.

(56) References Cited

U.S. PATENT DOCUMENTS

| | | |
|---|---|---|
| 2011/0299395 A1* | 12/2011 | Mariblanca Nieves ................ H04L 12/5695 370/235 |
| 2012/0257499 A1 | 10/2012 | Chatterjee et al. |

(Continued)

FOREIGN PATENT DOCUMENTS

| | | |
|---|---|---|
| EP | 2498526 A1 | 9/2012 |
| JP | 2004-048289 A | 2/2004 |

(Continued)

OTHER PUBLICATIONS

China Mobile et al.; "Clarification of GTP-u based Ran Congestion Awareness Solution"; 3GPP S2-131759; (May 27-31, 2013); 4 pages; SA WG2 Meeting #52-97, Busan, South Korea; Agenda: 6.6; Release UPCON.

(Continued)

*Primary Examiner* — Andrew Lee
(74) *Attorney, Agent, or Firm* — Thorpe North & Western

(57) ABSTRACT

Technology for reducing user plane congestion is disclosed. An inquiry request message can be received at a mobility management entity (MME) from a congestion information collection function (CICF). The inquiry request message can request an international mobile subscriber identity (IMSI) and a packet data network (PDN) connection identifier (ID) associated with user equipments (UEs) that are impacted by radio access network (RAN) user plane congestion. The IMSI and the PDN connection ID that are associated with the UEs can be identified based in part on the inquiry request message. An inquiry response message that includes the IMSI and the PDN connection ID can be sent to the CICF (Continued)

to enable the CICF to discover an assigned policy and charging rules function (PCRF) for the UEs that are impacted by the RAN user plane congestion, wherein the PCRF is configured to implement network policies to reduce the RAN user plane congestion.

20 Claims, 8 Drawing Sheets

(51) Int. Cl.

| | | |
|---|---|---|
| *H04B 7/06* | (2006.01) | |
| *H04B 7/04* | (2017.01) | |
| *H04W 12/02* | (2009.01) | |
| *H04W 48/16* | (2009.01) | |
| *H04W 28/02* | (2009.01) | |
| *H04B 7/0452* | (2017.01) | |
| *H04L 27/20* | (2006.01) | |
| *H04W 92/24* | (2009.01) | |
| *H04W 4/00* | (2018.01) | |
| *H04W 76/02* | (2009.01) | |

(52) U.S. Cl.
CPC .......... *H04B 7/063* (2013.01); *H04B 7/0617* (2013.01); *H04B 7/0626* (2013.01); *H04B 7/0632* (2013.01); *H04B 7/0639* (2013.01); *H04L 27/20* (2013.01); *H04W 4/005* (2013.01); *H04W 12/02* (2013.01); *H04W 28/0289* (2013.01); *H04W 48/16* (2013.01); *H04W 92/24* (2013.01); *H04W 76/023* (2013.01)

(56) References Cited

U.S. PATENT DOCUMENTS

| | | | | |
|---|---|---|---|---|
| 2012/0324100 | A1 | 12/2012 | Tomici et al. | |
| 2013/0272197 | A1* | 10/2013 | Avila Gonzalez | H04W 28/02 370/328 |
| 2015/0117204 | A1* | 4/2015 | Lott | H04L 45/306 370/235 |
| 2015/0201394 | A1* | 7/2015 | Qu | H04W 4/02 455/456.1 |
| 2015/0365843 | A1* | 12/2015 | Miklos | H04W 28/0289 370/235 |
| 2015/0382230 | A1* | 12/2015 | Miklos | H04W 28/0247 370/230 |
| 2016/0105881 | A1* | 4/2016 | Kim | H04L 61/2007 455/450 |
| 2016/0255522 | A1* | 9/2016 | Emanuelsson | H04W 8/10 |
| 2016/0269929 | A1* | 9/2016 | Livanos | H04W 28/0289 |
| 2016/0359750 | A1* | 12/2016 | Miklos | H04L 47/24 |
| 2017/0013502 | A1* | 1/2017 | Baniel | H04W 28/0289 |
| 2017/0019750 | A1* | 1/2017 | Palanisamy | H04W 76/066 |

FOREIGN PATENT DOCUMENTS

| | | |
|---|---|---|
| KR | 10-2013-0045718 A | 5/2013 |
| WO | WO 2011/082035 A2 | 7/2011 |

OTHER PUBLICATIONS

3GPP TR 23.705; "3rd Generation Partnership Project; Technical Specification Group Services and System Aspects; System Enhancements for User Plane Congestion Management"; (Apr. 2013); 18 pages; V0.3.0, Release 12.

Samsung; "How to handle roaming and Ran sharing cases for congestion notification"; 3GPP TSG TD S2-131638; (May 27-31, 2013); 4 pages; SA WG2 Meeting #97, Busan Korea; Agenda: 6.6; Release UPCON/Rel-12.

Extended European search report issued dated Dec. 16, 2016; in EP Application No. 14803471.3; filed May 22, 2014; 16 pages.

* cited by examiner

REDUCTION OF USER PLANE CONGESTION

RELATED APPLICATIONS

The present application claims priority to U.S. Provisional Patent Application No. 61/829,968, filed May 31, 2013, the entire specification of which is hereby incorporated by reference in its entirety for all purposes.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In homogeneous networks, the node, also called a macro node, can provide basic wireless coverage to wireless devices in a cell. The cell can be the area in which the wireless devices are operable to communicate with the macro node. Heterogeneous networks (HetNets) can be used to handle the increased traffic loads on the macro nodes due to increased usage and functionality of wireless devices. HetNets can include a layer of planned high power macro nodes (or macro-eNBs) overlaid with layers of lower power nodes (small-eNBs, micro-eNBs, pico-eNBs, femto-eNBs, or home eNBs [HeNBs]) that can be deployed in a less well planned or even entirely uncoordinated manner within the coverage area (cell) of a macro node. The lower power nodes (LPNs) can generally be referred to as "low power nodes", small nodes, or small cells.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1A:
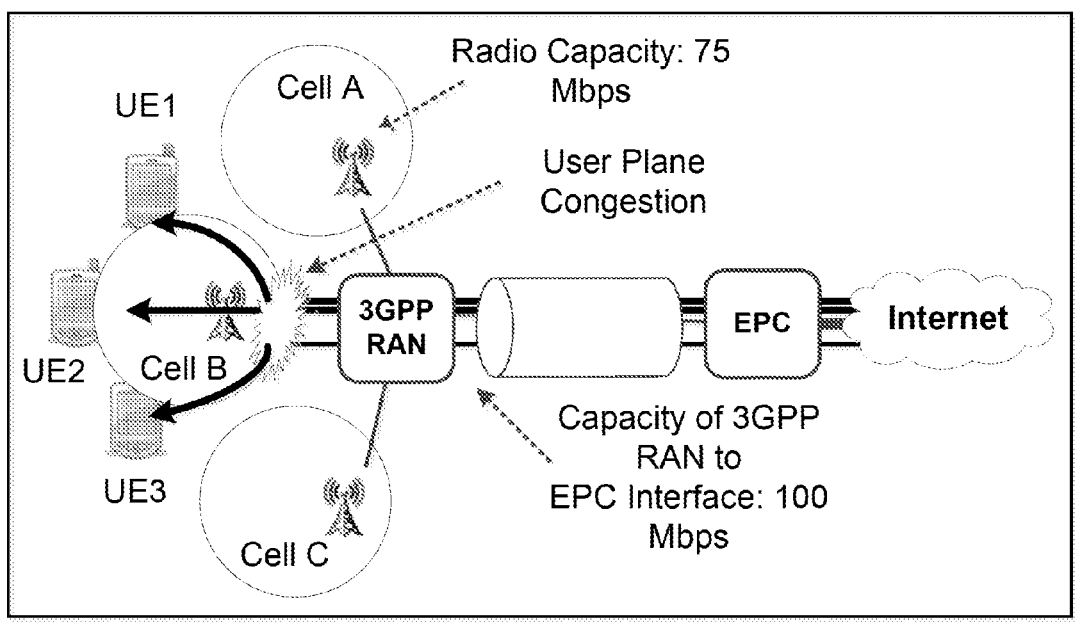
FIG. 1A illustrates user plane congestion (UPCON) due to exceeding a radio capacity of a cell in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In recent years, mobile operators have seen significant increases in user traffic data. Although the data capacity of networks has increased, the observed increase in user traffic data continues to outpace the growth of network data capacity. In general, Radio Access Network (RAN) user plane congestion (UPCON) may occur when the demand for RAN resources (i.e., for the transfer of user data) exceeds the capacity of the RAN resources. As a result, users may receive the data with a reduced quality of service (QoS). Thus, the increase of network congestion may degrade the user service experience. In general, user plane congestion (i.e., data plane congestion), or UPCON, may be triggered under two scenarios: (1) User plane congestion due to full use of cell capacity; and (2) User plane congestion due to limitations of the 3GPP RAN to Evolved Packet Core (EPC) interface.

FIG. 1A illustrates an example of user plane congestion (UPCON) due to full use of cell capacity. The Third Generation Partnership Project (3GPP) Radio Access Network (RAN) node may be in communication with an evolved packet core (EPC). The EPC may be included in the core network (CN). In one example, the capacity of the 3GPP RAN to EPC interface may be 100 megabits per second (Mbps). The 3GPP RAN node may communicate user data to a plurality of user devices or user equipments (UEs) located within a cell. UPCON may occur when the traffic volume in Cell B exceeds the capacity of the cell. For example, the plurality of UEs in the cell may generate user plane traffic that equals the cell capacity. When an additional or an existing UE attempts to generate additional user plane traffic in the cell, congestion may occur in that cell. As an example, the 3GPP RAN may communicate user data to Cells A, B, and C. The radio capacity may be 75 Mbps for Cells A, B, and C. UPCON may occur when the traffic volume in Cell B exceeds the capacity of the cell. (e.g., 75 Mbps).

Figure 1B:
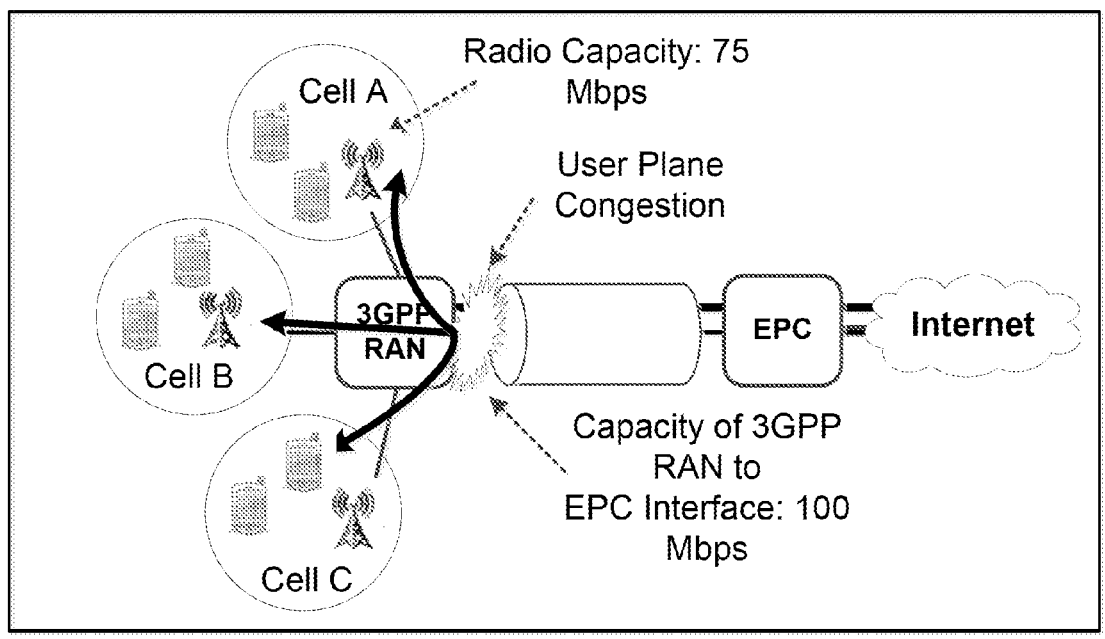
FIG. 1B illustrates UPCON due to a capacity limitation of a Third Generation Partnership Project (3GPP) Radio Access Network (RAN) to Evolved Packet Core (EPC) interface in accordance with an example.

FIG. 1B illustrates an example of UPCON due to a capacity limitation of a Third Generation Partnership Project (3GPP) Radio Access Network (RAN) to Evolved Packet Core (EPC) interface. The 3GPP RAN may be in communication with the EPC. The EPC may be included in the Core Network (CN). In one example, the capacity of the 3GPP RAN to EPC interface may be 100 megabits per second (Mbps). The 3GPP RAN may communicate user data to Cells A, B and C, wherein each of the cells may contain a plurality of user devices or UEs. The radio capacity for each cell may be 75 Mbps. When the volume of the user plane data communicated to the plurality of UEs in Cells A, B, and C is greater than the capacity of the 3GPP RAN to EPC interface, UPCON may occur at the 3GPP RAN. For example, the volume of the user plane data may be greater than the capacity of the 3GPP RAN to EPC interface (e.g., 100 Mbps). As a result, all of the UEs in Cells A, B, and C may experience excessive data rate reduction or service denial. Even though each cell (e.g., Cells A, B, and C) may have the necessary capacity to support the plurality of UEs being served within that cell, the capacity limitations of the 3GPP RAN to EPC interface may adversely impact one or more UEs in Cells A, B, and C. As a result, the UPCON at the 3GPP RAN to EPC interface may prevent the plurality of UEs from sending user data to or receiving user data from the EPC.

Figure 2:
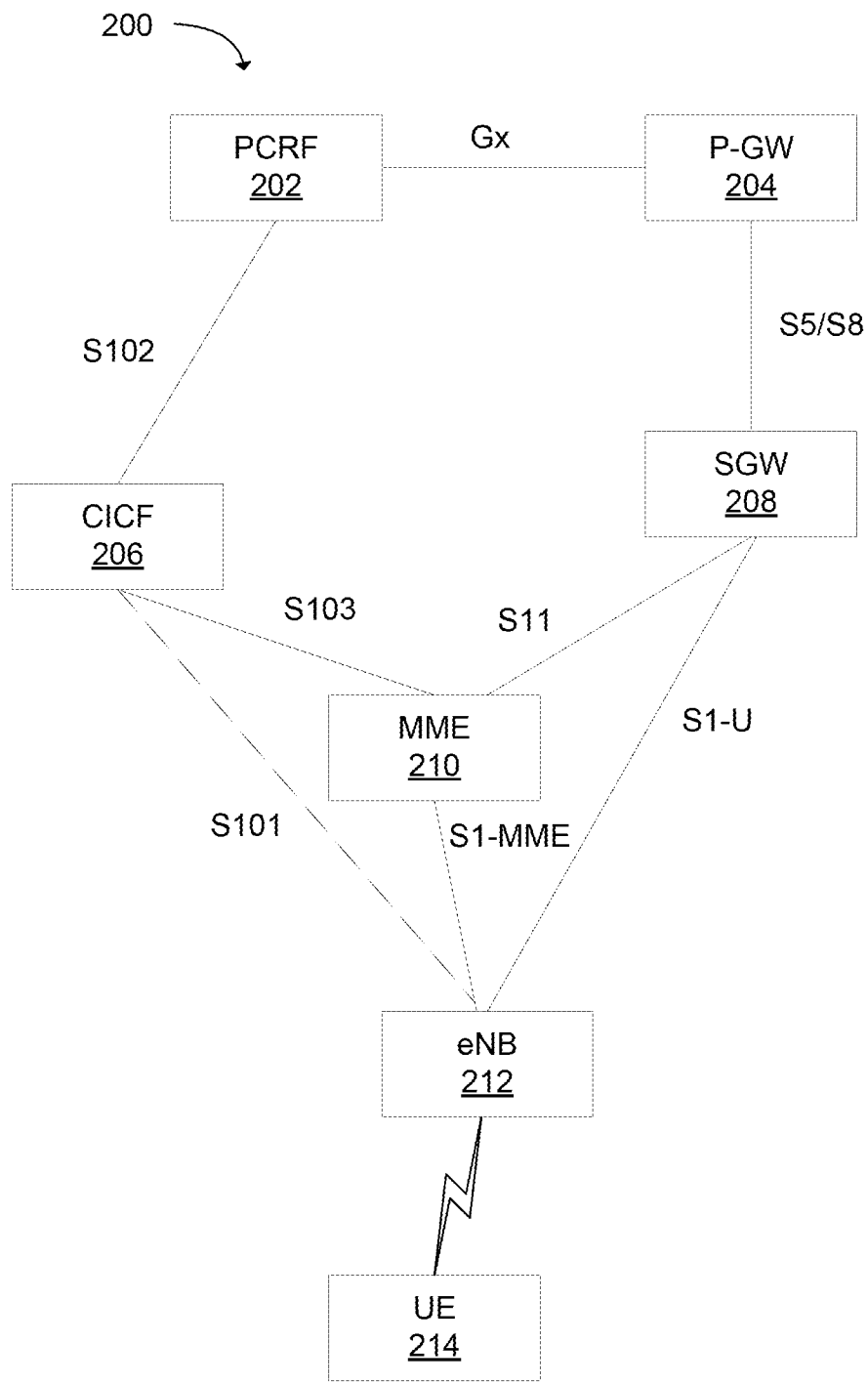
FIG. 2 illustrates a system architecture for reducing user plane congestion in accordance with an example.

FIG. 2 illustrates exemplary system architecture 200 for reducing user plane congestion. The system 200 may include a Policy Control and Charging Rules Function (PCRF) 202, a packet data network gateway (P-GW) 204, a congestion information collection function (CICF) 206, a serving gateway (SGW) 208, a mobility management entity (MME) 210 and an evolved node B (eNB) 212. The eNB 212 may communicate with a user equipment (UE) 214.

The PCRF 202 is a software node or functional element that can provide policy control and flow-based charging control decisions. The PCRF 202 can determine policy rules in a multimedia network in real-time. The PCRF 202 can aggregate information to and from the network, support the creation of rules and then automatically make policy decisions for each subscriber active on the network. For example, the PCRF 202 can receive an indication that the network is congested or is about to become congested. The PCRF 202 can apply policies to relieve or mitigate the congestion while taking into account a level of service that should be provided to any affected subscribers.

The P-GW 204 is a gateway that terminates an interface towards a packet data network (PDN). The P-GW 204 may provide connectivity from the UE 214 to an external PDN by being a point of entry or exit of traffic for the UE 214. The SGW 208 is a gateway which terminates an interface towards an Evolved Universal Terrestrial Radio Access Network (E-UTRAN). There may be a single SGW 208 for each UE 214 associated with an evolved packet system (EPS) at a given point in time. The MME 210 is a control node that can process signaling between the UE 214 and a Core Network (CN).

The CICF 206 is a node located in the EPC that can collect RAN congestion information (RCI) either directly from a RAN node (e.g., the eNB 212) or through other network elements, such as the MME 210, SGW 208 or P-GW 204. In addition, the CICF 206 may collect the RCI from an operation and maintenance (O&M) system or an access network discovery and selection function (ANDSF) node (not shown in FIG. 2). In general, the ANDSF node can assist the UE 214 in discovering non-3GPP access networks—such as Wi-Fi or WiMAX—that can be used for data communications in addition to 3GPP access networks. The ANDSF node can also provide the UE 214 with rules policing the connection to these access networks.

The CICF 206 can inquire about an international mobile subscriber identity (IMSI) of a particular UE 214 from the MME 210 by providing the MME 210 an eNB UE S1 application protocol (S1AP) identifier (ID) and an MME UE S1AP ID. In addition, the CICF 206 can inquire a list of IMSIs and related PDN IDs (e.g., access point names or APNs) for each of the IMSIs on the list by providing a cell ID or eNB ID to the MME 210. The CICF 206 can store RCI for a period of time. The CICF 206 can discover a proper PCRF 202 for the UE 214 that is impacted by the user plane congestion based on the IMSI and PDN ID. In addition, the CICF 206 can interact with the PCRF 202 for reporting the UPCON event and other related information, such as a congestion level, cell ID, IMSI and/or PDN ID.

In one example, the PCRF 202 and the P-GW 204 are connected via a Gx interface. The PCRF 202 and the CICF 206 are connected via an S102 interface. The CICF 206 and the MME 210 are connected via an S103 interface. The CICF 206 and the eNB 212 are connected via an S101 interface. The SGW 208 and the P-GW 204 are connected via an S5/S8 interface. The SGW 208 and the MME 210 are connected via an S11 interface. The SGW 208 and the eNB 212 are connected via an S1-U interface. The MME 210 and the eNB 212 are connected via an S1-MME interface. The eNB 212 may communicate with the UE 214 via an over-the-air interface. The S1-MME, S1-U, S11, S5/S8 and Gx interfaces are further described in 3GPP Technical Specification (TS) 23.401.

In one configuration, RAN congestion information (RCI) may be reported from the eNB 212 directly to a standalone function, such as the CICF 206. The RCI report may include a congested interface direction and node, such as (1) radio interface downlink (e.g., LTE-Uu, Uu), (2) radio interface uplink, (3) network interface downlink (e.g., Gb, Iu-PS, S1-U), (4) network interface uplink, or (5) the RAN node itself (e.g., eNB, RNC, base station system or BSS). The RCI report may include a congestion severity level, such as a predefined number indicating the level of congestion (e.g., 0 to 7, wherein a smaller number indicates that the congestion is less severe or vice versa). The RCI report may include a congestion situation (i.e., whether congestion is present).

In one example, 0 indicates that congestion has disappeared, whereas 1 indicates that congestion has appeared. The RCI report may include location information, such as a cell ID or eNB ID. In other words, the RCI report may include cell IDs or eNB IDs that are experiencing congestion.

The RCI report may include S1AP level user identifiers, such as eNB UE S1AP ID and MME UE S1AP ID. The S1AP level user identifiers can identify specific UEs that are impacted by the user plane congestion. As further explained in 3GPP TS 36.401, AP IDs are allocated when a new UE-associated logical connection is created in either the eNB 212 or the MME 210. The AP ID uniquely identifies a logical connection associated to the UE 214 over the S1 interface or X2 interface within a node (e.g., the eNB 212 or MME 210). The eNB UE S1AP ID is allocated to uniquely identify the UE 214 over the S1 interface within the eNB 214. The MME UE S1AP ID is allocated to uniquely identify the UE 214 over the S1 interface within the MME 210. The eNB UE S1AP ID and the MME UE S1AP ID can be 32-bit integers.

In one configuration, the CICF 206 can discover the PCRF 202 that serves each UE 214 impacted by congestion upon receiving the RCI report from the eNB 212. The PCRF 202 can implement various policies in order to reduce user plane congestion that is affecting the performance of the UE 214. In one example, the CICF 206 can discover the serving PCRF 202 (or assigned PCRF 202) for each impacted UE 214 using a diameter routing agent (DRA).

The DRA is a functional element that keeps status of the assigned PCRF 202 for a certain UE 214 and IP-CAN session across various reference points (e.g., Gx and S9 interfaces). The DRA can be located in the EPC as a standalone entity. The DRA provides real-time routing capabilities to ensure that messages are routed among the correct elements in the network. The DRA retains mapping information for the user identity (e.g., IMSI), the UE internet protocol (IP) address, the PDN ID and the assigned PCRF 202 for the IP-CAN of the specific UE 214 impacted by the user plane congestion. In addition, the DRA ensures that all Diameter sessions established over the Gx, S9, Gxx and Rx reference points for a certain IP-CAN session reach the same PCRF 202 when multiple and separately addressable PCRFs have been deployed in a Diameter realm.

Since the DRA retains mapping information related to the IMSI and PDN ID, the CICF 206 generally needs to know the IMSI and PDN ID of the specific UEs that are impacted by the user plane congestion when using the DRA to determine the assigned PCRF 202. However, the CICF 206 generally does not know the IMSI and the PDN ID of the UE 214. The CICF 206 generally does not receive the IMSI and the PDN ID from the eNB 212 (i.e., the IMSI and the PDN ID is generally not included in the RCI received from the eNB 212). Since the eNB 214 uses the MME UE S1AP ID and the eNB UE S1AP ID to indicate the user identity in the RCI reporting message upon detecting RAN user plane congestion, the CICF 206 generally only knows the MME UE S1AP ID and the eNB UE S1AP ID of the impacted UE 214.

Therefore, the CICF 206 can inquire the MME 210 about the user identity and PDN ID of the impacted UE 214 before contacting the DRA in order to determine the assigned PCRF 202. The CICF 206 can inquire about the user identity and PDN ID (i.e., the APN in use) to the MME 210 via the S103 interface. The CICF 206 may include the MME UE S1AP ID in the inquiry to the MME 210. Alternatively, the CICF can include cell IDs or eNB IDs that are affected by the user plane congestion in the inquiry to the MME 210. In addition, the inquiry can include a purpose for the inquiry (e.g., the purpose of RAN user plane congestion mitigation). Upon receiving the inquiry (or request) from the CICF 206, the MME 210 can identify the user identity (e.g., IMSI) from the MME UE S1AP ID using mapping information.

Alternatively, the MME 210 can identify a list of UEs under the congested cell or eNB. In other words, the UEs on the list are being served by a cell ID or eNB ID that is experiencing user plane congestion. The MME 210 can determine which PDN connection will be impacted depending on the MME UE S1AP ID, cell ID or eNB ID. In other words, the MME 210 can use the MME UE S1AP ID, cell ID or eNB ID to determine the PDN ID of the UE 214 impacted by the user plane congestion. The MME 210 can reply back to the CICF 206 with the IMSI (or an IMSI list) and the PDN ID(s). The CICF 206 may use the IMSIs and the PDN IDs to discover the assigned PCRF 202 via the DRA. Thereafter, the assigned PCRF 202 can implement network policies to reduce the user plane congestion, thereby improving network performance with respect to the UE 214.

Figure 3:
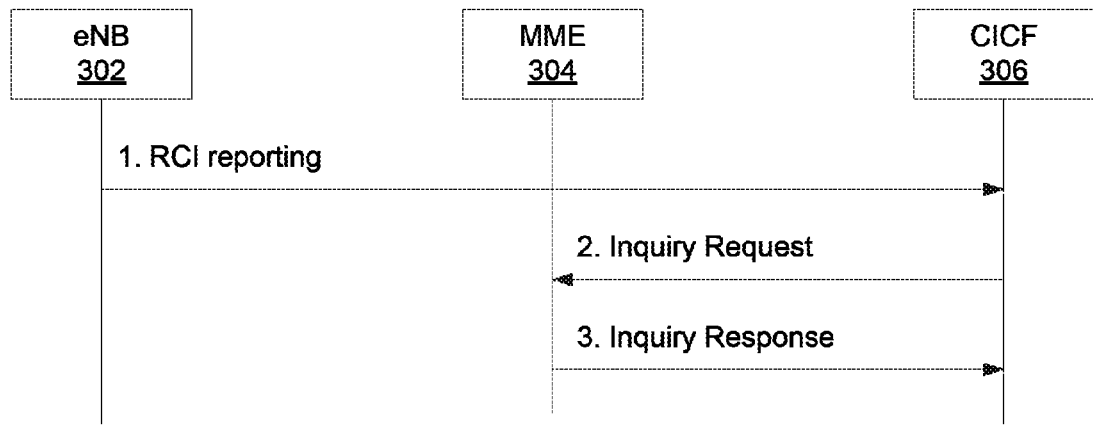
FIG. 3 illustrates radio access network (RAN) congestion information (RCI) reporting from an evolved node B (eNB) to a congestion information collection function (CICF) in accordance with an example.

FIG. 3 illustrates an example of radio access network (RAN) congestion information (RCI) reporting from an evolved node B (eNB) 302 to a congestion information collection function (CICF) 306. In step 1, when RAN user plane congestion occurs, the eNB 302 can report the RCI to the CICF 306. The RCI report can include a congested interface direction and node, a congestion severity level, a congestion situation, location information, and S1AP level user identifiers that indicate UEs that are affected by the RAN user plane congestion. In particular, the RCI report can include two S1AP level identifiers (i.e., eNB UE S1AP ID and MME UE S1AP ID) to indicate the UEs impacted by the RAN user plane congestion.

The CICF 306 may receive the RCI report from the eNB 302. The CICF 306 may determine that the two S1AP level identifiers in the RCI report cannot be mapped to a corresponding international mobile subscriber identity (IMSI) and packet data network (PDN) connection ID (e.g., APN, PDN type, UE IP address). In other words, the CICF 306 may be unable to determine the IMSI and PDN connection ID of specific UEs that are impacted by the RAN user plane congestion using the two S1AP level identifiers. Therefore, in step 2, the CICF 306 may send an inquiry request message to a mobility management entity (MME) 304. The inquiry request message may be a request for the IMSI and PDN connection ID for the two S1AP user identifiers. The CICF 306 can include the two S1AP user identifiers in the inquiry request message. In one example, the inquiry request message may include more than one UE context identifier. The CICF 306 may send the inquiry request message to the MME 304 via an S103 interface.

The MME 304 may receive the inquiry request message from the CICF 306. The MME 304 may determine the IMSI and impacted PDN connection ID based on the two S1AP user identifiers included in the inquiry request message. The MME 304 can include mapping information between the S1AP identifiers and the IMSI. The MME 304 may determine the IMSI and impacted PDN connection ID either based on the configuration or the user's subscription. In other words, the MME 304 may contain mapping information about the IMSI and the impacted PDN connection ID. In step 3, the MME 304 can send an inquiry response message to the CICF 306. The inquiry response message can include the IMSI and PDN connection ID corresponding to the specific UE that is impacted by the congestion.

After step 3, the CICF 306 can discover the assigned PCRF for the specific UE and PDN connection ID according to 3GPP TS 23.203 Section 7.6. For example, the CICF 306 can discover the assigned PCRF using a DRA. The CICF 306 can provide the IMSI and the PDN connection ID to the assigned PCRF. The assigned PCRF can implement policies for reducing congestion and improving performance at the UE based on the IMSI and PDN connection ID. For example, the PRCF can reduce a maximum bitrate, reduce a bitrate CODEC, provide audio data with reduced bitrate video data, or remove video data. In one example, the PCRF can adjust the QoS by setting a maximum bitrate (e.g., 1 Mbps).

Figure 4:
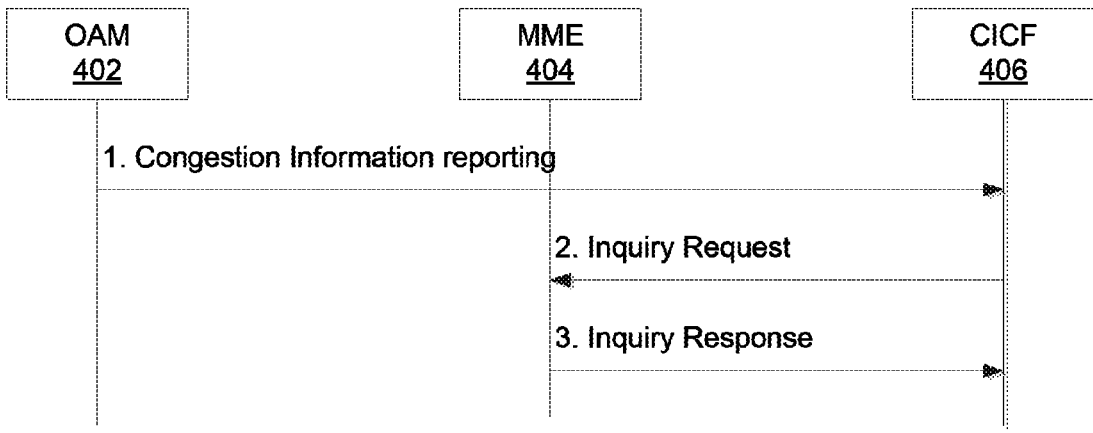
FIG. 4 illustrates radio access network (RAN) congestion information (RCI) reporting from an operations and maintenance (OAM) node to a congestion information collection function (CICF) in accordance with an example.

FIG. 4 illustrates an example of radio access network (RAN) congestion information (RCI) reporting from an operations and maintenance (OAM) node 402 to a congestion information collection function (CICF) 406. In step 1, when RAN user plane congestion occurs, the OAM 402 can report the RCI to the CICF 406. The RCI report can include a congested interface direction and node, a congestion severity level, a congestion situation, location information, and S1AP level user identifiers that indicate UEs that are affected by the RAN user plane congestion. In addition, the RCI report can include one or more cell IDs or eNB IDs indicating particular cells or eNBs that are impacted by the RAN user plane congestion.

The CICF 406 may receive the RCI report from the eNB 402. The CICF 306 may be unable to identify the one or more UEs that are associated with the impacted cell IDs or eNB IDs. In other words, the CICF 306 may know which cell IDs or eNB IDs are impacted by the congestion, but may be unable to identify specific UEs within those cells that are impacted by the congestion. Therefore, in step 2, the CICF 406 may send an inquiry request message to a mobility management entity (MME) 404. The inquiry request message may include the cell IDs or eNB IDs that are impacted by the congestion. The inquiry request message may be an inquiry about a list of UEs that operate within the congested cell or eNB. In particular, the inquiry request message may request for the IMSI and PDN connection ID for the UEs on the list (i.e., the UEs associated with the cell ID or eNB that are impacted by the congestion). The CICF 406 may send the inquiry request message to the MME 404 via an S103 interface.

The MME 404 may receive the inquiry request message from the CICF 306. The MME 404 may determine the IMSI and impacted PDN connection ID for the list of UEs based on the cell IDs or eNB IDs included in the inquiry request message. The MME 404 may contain mapping information to determine the IMSI and impacted PDN ID based on specific UE IDs. In step 3, the MME 404 can send an inquiry response message to the CICF 406. The inquiry response message can include the IMSI and PDN connection ID corresponding to the list of UEs that are impacted by the congestion.

After step 3, the CICF 406 can discover the assigned PCRF for the specific UE and PDN connection ID according to 3GPP TS 23.203 Section 7.6. The CICF 406 can provide the IMSI and the PDN connection ID to the assigned PCRF. The assigned PCRF can implement policies for reducing congestion and improving performance at the UE based on the IMSI and PDN connection ID.

In one configuration, the CICF 406 can subscribe to the MME 404 for the list of UEs that operate within a congested cell or eNB as described above. The MME 404 can periodically update the UE list to the CICF 406 in a timely manner. Therefore, the CICF 406 does not have to inquire the MME 404 for the list of UEs and related APNs when receiving the congestion information.

Figure 5:
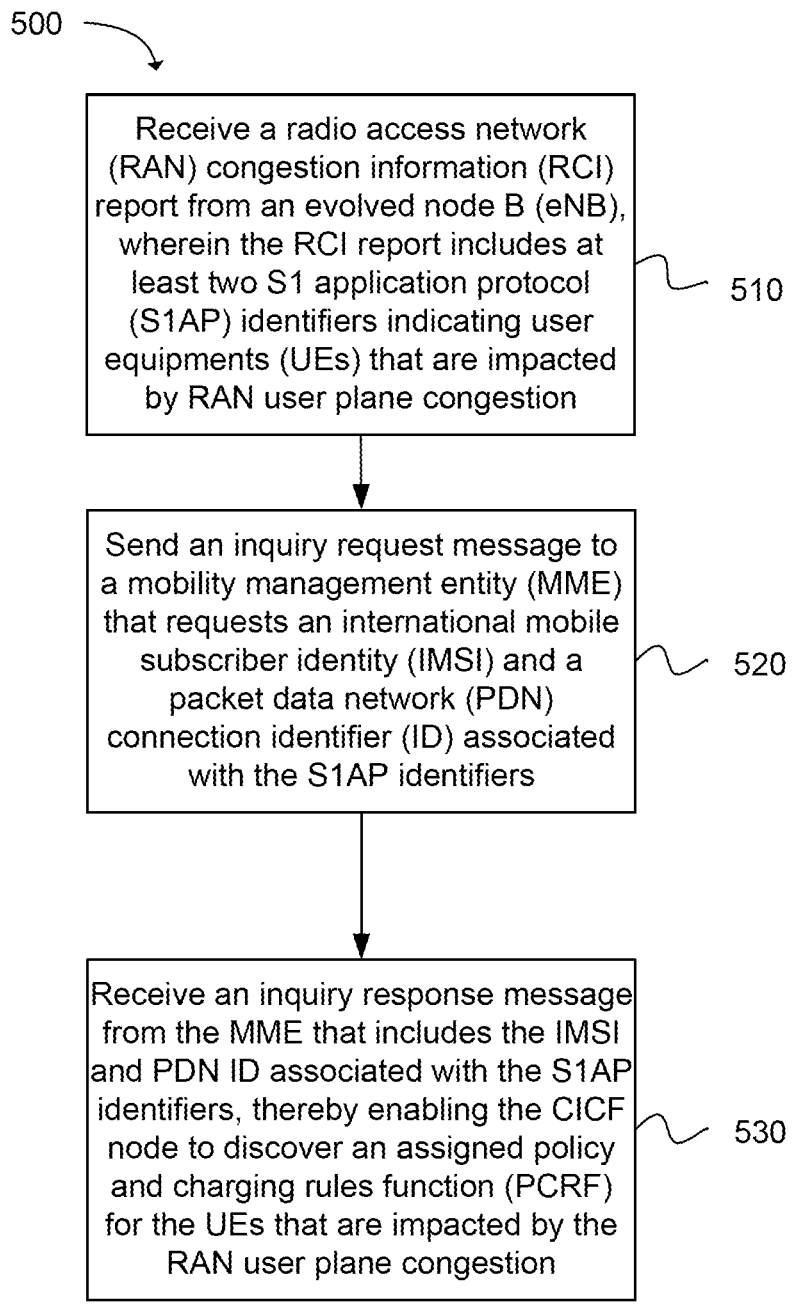
FIG. 5 depicts functionality of computer circuitry of a congestion information collection function (CICF) node operable to assist in reducing user plane congestion in accordance with an example.

Another example provides functionality 500 of computer circuitry of a congestion information collection function (CICF) node operable to assist in reducing user plane congestion, as shown in the flow chart in FIG. 5. The functionality may be implemented as a method or the functionality may be executed as instructions on a machine, where the instructions are included on at least one computer readable medium or one non-transitory machine readable storage medium. The computer circuitry can be configured to receive a radio access network (RAN) congestion information (RCI) report from an evolved node B (eNB), wherein the RCI report includes at least two S1 application protocol (S1AP) identifiers indicating user equipments (UEs) that are impacted by RAN user plane congestion, as in block 510. The computer circuitry can be configured to send an inquiry request message to a mobility management entity (MME) that requests an international mobile subscriber identity (IMSI) and a packet data network (PDN) connection identifier (ID) associated with the S1AP identifiers, as in block 520. The computer circuitry can be further configured to receive an inquiry response message from the MME that includes the IMSI and PDN ID associated with the S1AP identifiers, thereby enabling the CICF node to discover an assigned policy and charging rules function (PCRF) for the UEs that are impacted by the RAN user plane congestion, as in block 530.

In one example, the computer circuitry can be further configured to discover the assigned PCRF for the UEs that are impacted by the RAN user plane congestion using a diameter routing agent (DRA), wherein the DRA includes mapping information between the assigned PCRF and the IMSI and PDN ID for an IP connectivity access network (IP-CAN) session of the UEs impacted by the RAN user plane congestion. In addition, the computer circuitry can be further configured to report a user plane congestion event and information associated with the user plane congestion event to the assigned PCRF, thereby enabling the assigned PCRF to reduce the RAN user plane congestion. In one example, the at least two S1AP identifiers include an MME UE S1AP ID and an eNB UE S1AP ID.

In one configuration, the PDN connection ID includes at least one of an access point name (APN), PDN type or UE internet protocol (IP) address. In addition, the CICF and the eNB are connected via an S101 interface, the CICF and the PCRF are connected via an S102 interface and the CICF and the MME are connected via a S103 interface. In one example, the computer circuitry can be further configured to receive RCI information from at least one of a RAN node, an operations and management (O&M) node, an access network discovery and selection function (ANDSF) node, the MME, a serving gateway (S-GW), a gateway general packet radio service (GPRS) support node (GGSN), or a packet data network gateway (PGW). In another example, the RCI includes a congested interface direction and node, a congestion severity level, a congestion situation, location information and the S1AP level user identifiers.

Figure 6:
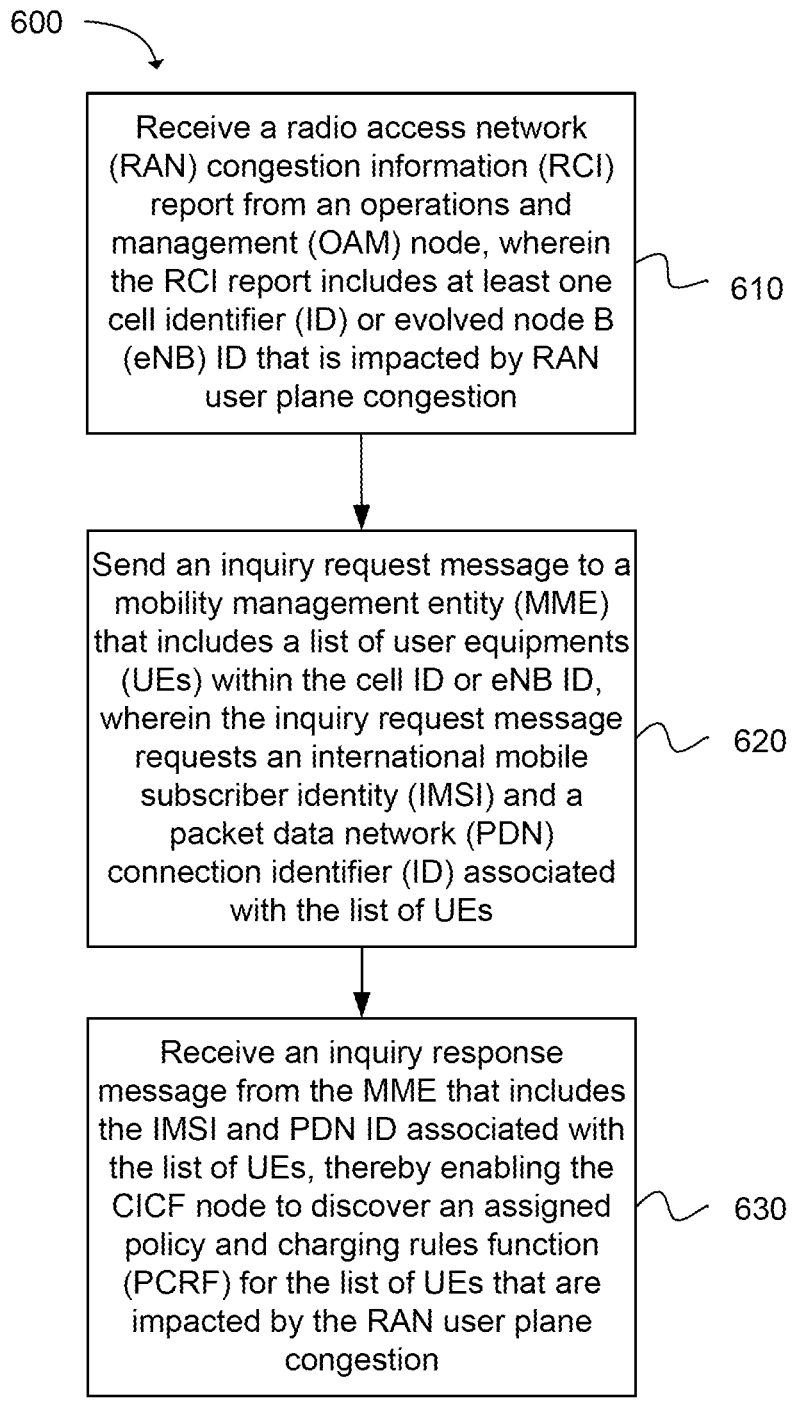
FIG. 6 depicts functionality of computer circuitry of yet another congestion information collection function (CICF) node operable to assist in reducing user plane congestion in accordance with an example.

Another example provides functionality 600 of computer circuitry of a congestion information collection function (CICF) node operable to assist in reducing user plane congestion, as shown in the flow chart in FIG. 6. The functionality may be implemented as a method or the functionality may be executed as instructions on a machine, where the instructions are included on at least one computer readable medium or one non-transitory machine readable storage medium. The computer circuitry can be configured to receive a radio access network (RAN) congestion information (RCI) report from an operations and management (OAM) node, wherein the RCI report includes at least one cell identifier (ID) or evolved node B (eNB) ID that is impacted by RAN user plane congestion, as in block 610. The computer circuitry can be configured to send an inquiry request message to a mobility management entity (MME) that includes a list of user equipments (UEs) within the cell ID or eNB ID, wherein the inquiry request message requests an international mobile subscriber identity (IMSI) and a packet data network (PDN) connection identifier (ID) associated with the list of UEs, as in block 620. The computer circuitry can be further configured to receive an inquiry response message from the MME that includes the IMSI and PDN ID associated with the list of UEs, thereby enabling the CICF node to discover an assigned policy and charging rules function (PCRF) for the list of UEs that are impacted by the RAN user plane congestion, as in block 630.

In one configuration, the computer circuitry can be further configured to report a user plane congestion event and information associated with the user plane congestion event to the assigned PCRF, thereby assisting the assigned PCRF in reducing the user plane congestion. In addition, the computer circuitry can be further configured to receive an updated message periodically from the MME, wherein the updated message includes the IMSI and PDN connection ID for an updated list of UEs that are impacted by the RAN user plane congestion. In one example, the computer circuitry can be further configured to discover the assigned PCRF for the UEs that are impacted by the RAN user plane congestion using a diameter routing agent (DRA), wherein the DRA includes mapping information between the assigned PCRF and the IMSI and the PDN ID for an IP connectivity access network (IP-CAN) session of the list of UEs impacted by the RAN user plane congestion.

In one example, the CICF and the eNB are connected via an S101 interface, the CICF and the PCRF are connected via an S102 interface and the CICF and the MME are connected via a S103 interface. In addition, the computer circuitry can be further configured to collect the RCI from at least one of a RAN node, an operations and management (O&M) node, an access network discovery and selection function (ANDSF) node, the MME, a serving gateway (S-GW), a gateway general packet radio service (GPRS) support node (GGSN), or a packet data network gateway (PGW). In one example, the RCI includes a congested interface direction and node, a congestion severity level, a congestion situation, location information and the S1AP level user identifiers. In another example, the UE includes an antenna, a touch sensitive display screen, a speaker, a microphone, a graphics processor, an application processor, internal memory, or a non-volatile memory port.

Figure 7:
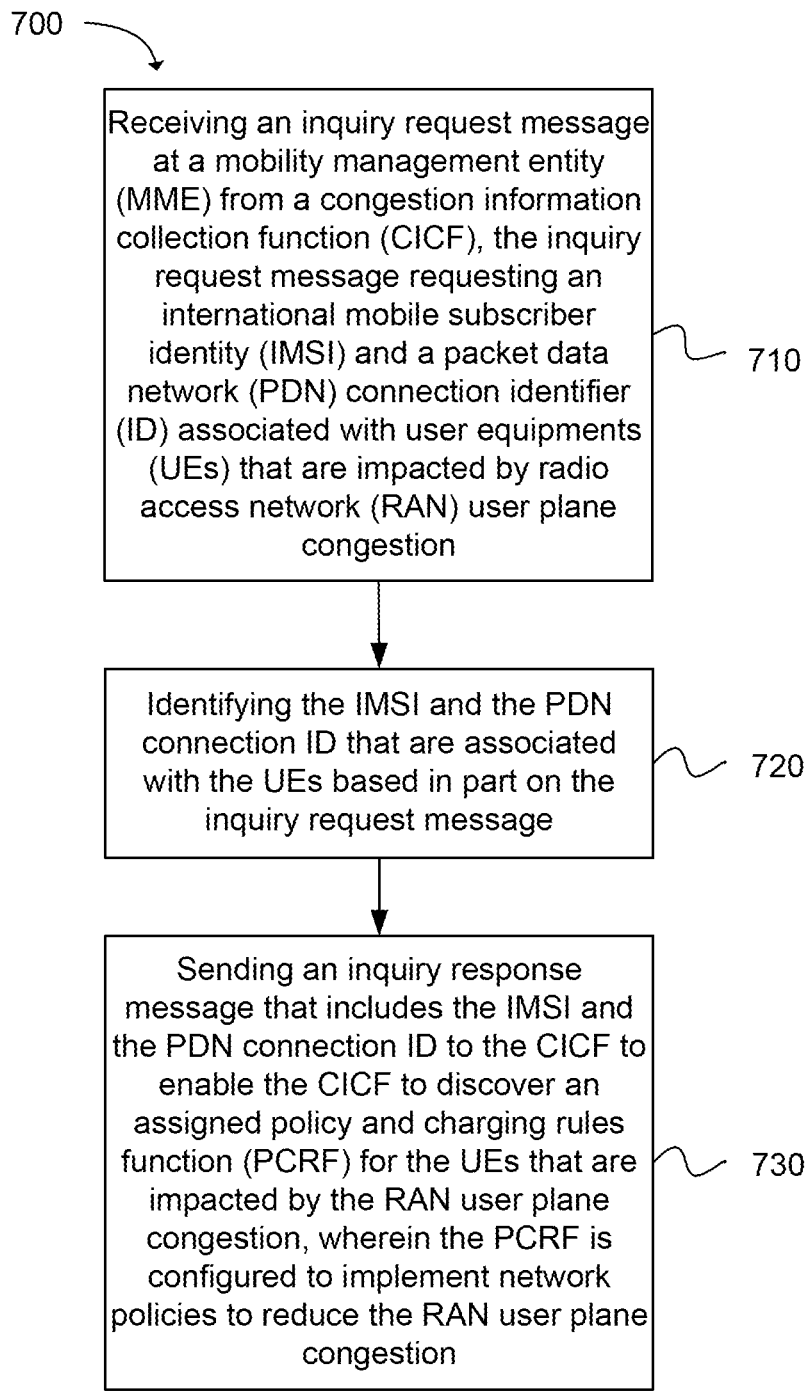
FIG. 7 depicts a flowchart of a method for reducing user plane congestion in accordance with an example.

Another example provides a method 700 for reducing user plane congestion, as shown in the flow chart in FIG. 7. The method may be executed as instructions on a machine, where the instructions are included on at least one computer readable medium or one non-transitory machine readable storage medium. The method includes the operation of receiving an inquiry request message at a mobility management entity (MME) from a congestion information collection function (CICF), the inquiry request message requesting an international mobile subscriber identity (IMSI) and a packet data network (PDN) connection identifier (ID) associated with user equipments (UEs) that are impacted by radio access network (RAN) user plane congestion, as in block 710. The method includes the operation of identifying the IMSI and the PDN connection ID that is associated with the UEs based in part on the inquiry request message, as in block 720. The method further includes the operation of sending an inquiry response message that includes the IMSI and the PDN connection ID to the CICF to enable the CICF to discover an assigned policy and charging rules function (PCRF) for the UEs that are impacted by the RAN user plane congestion, wherein the PCRF is configured to implement network policies to reduce the RAN user plane congestion, as in block 730.

In one configuration, the method further comprises receiving at least two S1 application protocol (S1AP) identifiers in the inquiry request message that indicate UEs that are impacted by the RAN user plane congestion, wherein the at least two S1AP identifiers include an MME UE S1AP ID and an eNB UE S1AP ID; and identifying the IMSI and the PDN connection ID associated with the UEs based in part on the at least two S1AP identifiers. In addition, the method further comprises receiving at least one cell identifier (ID) or evolved node B (eNB) ID in the inquiry request message that indicates at least one cell or eNB that is impacted by the RAN user plane congestion; and identifying the IMSI and the PDN connection ID for a list of UEs that are associated with the at least one cell ID or eNB ID, wherein the UEs on the list are impacted by the RAN user plane congestion.

Figure 8:
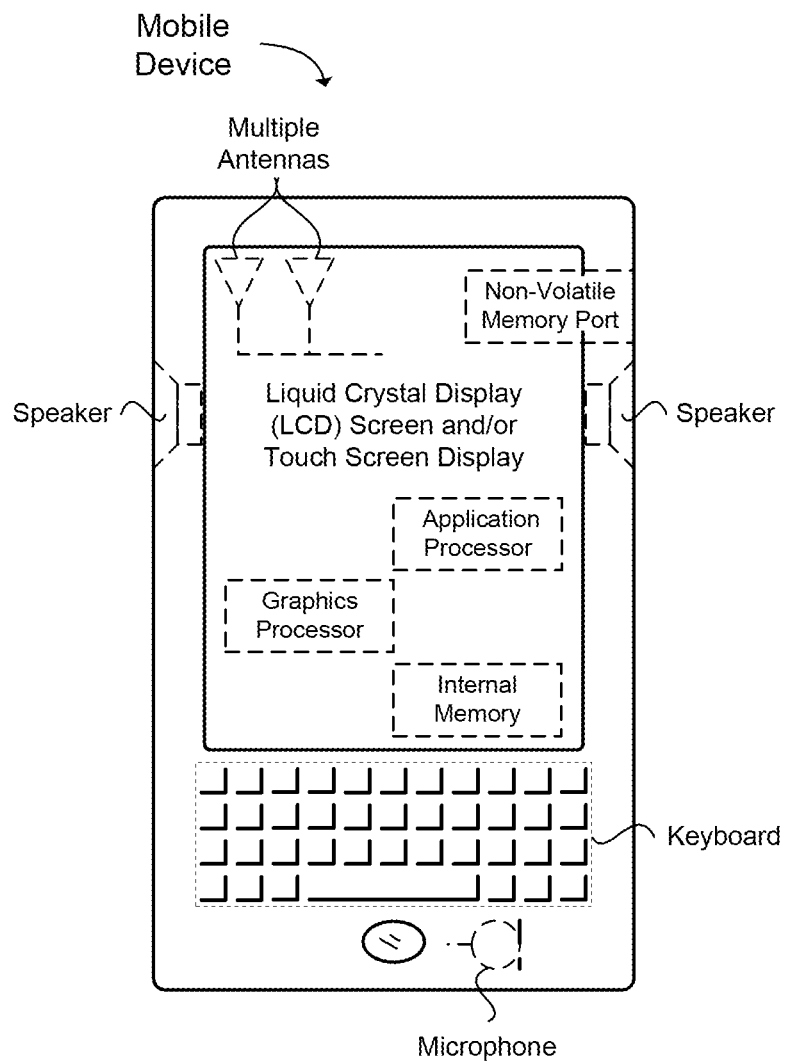
FIG. 8 illustrates a diagram of a wireless device (e.g., UE) in accordance with an example.

FIG. 8 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 8 also provides an illustration of a microphone and one or more speakers that can be used for audio input and output from the wireless device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the wireless device. A keyboard may be integrated with the wireless device or wirelessly connected to the wireless device to provide additional user input. A virtual keyboard may also be provided using the touch screen.

Various techniques, or certain aspects or portions thereof, may take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, EPROM, flash drive, optical drive, magnetic hard drive, solid state drive, or other medium for storing electronic data. The node and wireless device may also include a transceiver module, a counter module, a processing module, and/or a clock module or timer module. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A congestion information collection function (CICF) node operable to assist in reducing user plane congestion, the CICF node having computer circuitry configured to:
   receive a radio access network (RAN) congestion information (RCI) report from an evolved node B (eNB), wherein the RCI report includes at least two S1 application protocol (S1AP) identifiers indicating user equipments (UEs) that are impacted by RAN user plane congestion;
   send an inquiry request message to a mobility management entity (MME) that requests an international mobile subscriber identity (IMSI) and a packet data network (PDN) connection identifier (ID) associated with the S1AP identifiers; and
   receive an inquiry response message from the MME that includes the IMSI and PDN ID associated with the S1AP identifiers, thereby enabling the CICF node to discover an assigned policy and charging rules function (PCRF) for the UEs that are impacted by the RAN user plane congestion.

2. The computer circuitry of claim 1, further configured to discover the assigned PCRF for the UEs that are impacted by the RAN user plane congestion using a diameter routing agent (DRA), wherein the DRA includes mapping information between the assigned PCRF and the IMSI and PDN ID for an IP connectivity access network (IP-CAN) session of the UEs impacted by the RAN user plane congestion.

3. The computer circuitry of claim 1, further configured to report a user plane congestion event and information associated with the user plane congestion event to the assigned PCRF, thereby enabling the assigned PCRF to reduce the RAN user plane congestion.

4. The computer circuitry of claim 1, wherein the at least two S1AP identifiers include an MME UE S1AP ID and an eNB UE S1AP ID.

5. The computer circuitry of claim 1, wherein the PDN connection ID includes at least one of an access point name (APN), PDN type or UE internet protocol (IP) address.

6. The computer circuitry of claim 1, wherein the CICF and the eNB are connected via an S101 interface, the CICF and the PCRF are connected via an S102 interface and the CICF and the MME are connected via a S103 interface.

7. The computer circuitry of claim 1, further configured to receive RCI information from at least one of a RAN node, an operations and management (O&M) node, an access network discovery and selection function (ANDSF) node, the MME, a serving gateway (S-GW), a gateway general packet radio service (GPRS) support node (GGSN), or a packet data network gateway (PGW).

8. The computer circuitry of claim 1, wherein the RCI includes a congested interface direction and node, a congestion severity level, a congestion situation, location information and the S1AP level user identifiers.

9. A congestion information collection function (CICF) node operable to assist in reducing user plane congestion, the CICF node having computer circuitry configured to:
receive a radio access network (RAN) congestion information (RCI) report from an operations and management (OAM) node, wherein the RCI report includes at least one cell identifier (ID) or evolved node B (eNB) ID that is impacted by RAN user plane congestion;
send an inquiry request message to a mobility management entity (MME) that includes a list of user equipments (UEs) within the cell ID or eNB ID, wherein the inquiry request message requests an international mobile subscriber identity (IMSI) and a packet data network (PDN) connection identifier (ID) associated with the list of UEs; and
receive an inquiry response message from the MME that includes the IMSI and PDN ID associated with the list of UEs, thereby enabling the CICF node to discover an assigned policy and charging rules function (PCRF) for the list of UEs that are impacted by the RAN user plane congestion.

10. The computer circuitry of claim 9, further configured to report a user plane congestion event and information associated with the user plane congestion event to the assigned PCRF, thereby assisting the assigned PCRF in reducing the user plane congestion.

11. The computer circuitry of claim 9, further configured to receive an updated message periodically from the MME, wherein the updated message includes the IMSI and PDN connection ID for an updated list of UEs that are impacted by the RAN user plane congestion.

12. The computer circuitry of claim 9, further configured to discover the assigned PCRF for the UEs that are impacted by the RAN user plane congestion using a diameter routing agent (DRA), wherein the DRA includes mapping information between the assigned PCRF and the IMSI and the PDN ID for an IP connectivity access network (IP-CAN) session of the list of UEs impacted by the RAN user plane congestion.

13. The computer circuitry of claim 9, wherein the CICF and the eNB are connected via an S101 interface, the CICF and the PCRF are connected via an S102 interface and the CICF and the MME are connected via a S103 interface.

14. The computer circuitry of claim 9, further configured to collect the RCI from at least one of a RAN node, an operations and management (O&M) node, an access network discovery and selection function (ANDSF) node, the MME, a serving gateway (S-GW), a gateway general packet radio service (GPRS) support node (GGSN), or a packet data network gateway (PGW).

15. The computer circuitry of claim 9, wherein the RCI includes a congested interface direction and node, a congestion severity level, a congestion situation, location information and the S1AP level user identifiers.

16. The computer circuitry of claim 9, wherein the UE includes an antenna, a touch sensitive display screen, a speaker, a microphone, a graphics processor, an application processor, internal memory, or a non-volatile memory port.

17. A method for reducing user plane congestion, the method comprising:
receiving an inquiry request message at a mobility management entity (MME) from a congestion information collection function (CICF), the inquiry request message requesting an international mobile subscriber identity (IMSI) and a packet data network (PDN) connection identifier (ID) associated with user equipments (UEs) that are impacted by radio access network (RAN) user plane congestion;
identifying the IMSI and the PDN connection ID that are associated with the UEs based in part on the inquiry request message; and
sending an inquiry response message that includes the IMSI and the PDN connection ID to the CICF to enable the CICF to discover an assigned policy and charging rules function (PCRF) for the UEs that are impacted by the RAN user plane congestion, wherein the PCRF is configured to implement network policies to reduce the RAN user plane congestion.

18. The method of claim 17, further comprising:
receiving at least two S1 application protocol (S1AP) identifiers in the inquiry request message that indicate UEs that are impacted by the RAN user plane congestion, wherein the at least two S1AP identifiers include an MME UE S1AP ID and an eNB UE S1AP ID; and
identifying the IMSI and the PDN connection ID associated with the UEs based in part on the at least two S1AP identifiers.

19. The method of claim 17, further comprising:
receiving at least one cell identifier (ID) or evolved node B (eNB) ID in the inquiry request message that indicates at least one cell or eNB that is impacted by the RAN user plane congestion; and
identifying the IMSI and the PDN connection ID for a list of UEs that are associated with the at least one cell ID or eNB ID, wherein the UEs on the list are impacted by the RAN user plane congestion.

20. At least one non-transitory machine readable storage medium comprising a plurality of instructions adapted to be executed to implement the method of claim 17.

* * * * *